US005192970A

United States Patent [19]

Findeis et al.

[11] Patent Number: 5,192,970

[45] Date of Patent: Mar. 9, 1993

[54] METHOD AND ARRANGEMENT FOR COPYING FILMSTRIPS

[75] Inventors: Günter Findeis, Sauerlach; Wilhelm Nitsch, München; Hans-Juergen Rauh, Strassl.-Hailafing; Wolfgang Zahn; Helmut Treiber, both of München; Hans-Georg Schindler, Holzkirchen, all of Fed. Rep. of Germany

[73] Assignee: AGFA-Gevaert Aktiengesellschaft, Leverkusen, Fed. Rep. of Germany

[21] Appl. No.: 760,018

[22] Filed: Sep. 13, 1991

[30] Foreign Application Priority Data

Oct. 1, 1990 [DE] Fed. Rep. of Germany ....... 4031022

[51] Int. Cl.[5] .............................................. G03B 27/52

[52] U.S. Cl. ....................................... 355/41; 355/35; 355/38; 355/40

[58] Field of Search ........................ 355/35, 38, 40, 41

[56] References Cited

U.S. PATENT DOCUMENTS

| | | | |
|---|---|---|---|
| 4,128,330 | 12/1978 | Fergg et al. | 355/32 |
| 4,251,156 | 2/1981 | Zimmerman | 355/41 |
| 4,279,502 | 7/1981 | Thurm | 355/38 |
| 4,294,537 | 10/1981 | Laska et al. | 355/35 |
| 4,464,045 | 8/1984 | Findeis | 355/38 |
| 4,704,026 | 11/1987 | Rauh | 355/38 |
| 4,797,713 | 1/1989 | Terashita et al. | 355/38 |

*Primary Examiner*—Monroe H. Hayes
*Attorney, Agent, or Firm*—Peter K. Kontler

[57] ABSTRACT

An exposed and developed filmstrip and band of similar length are connected edge-to-edge. An address for each negative of the filmstrip is imprinted on the band in the form of a bar code adjacent to the respective negative. The negatives are scanned and exposure values are calculated for the negatives from the resulting data. The exposure values are used to make proofs, and the exposure values for each negative are then stored in a memory under the corresponding address. When an order for final copies of a particular negative is subsequently received, the address of the negative is read from the band and used to retrieve the respective exposure values from the memory. The final copies are thereupon made based upon the retrieved exposure values.

18 Claims, 3 Drawing Sheets

METHOD AND ARRANGEMENT FOR COPYING FILMSTRIPS

BACKGROUND OF THE INVENTION

The invention relates generally to the production of copies from a master or original.

More particularly, the invention relates to a method and arrangement for making high-quality copies of a strip of masters using a copier with a measuring system for the densities of the masters. Trial copies of the masters are produced and evaluated, and corrections to the amounts of copy light are thereupon made as necessary to optimize the copies. Data relating to the optimized amounts of copy light are stored in a memory and used in the production of additional copies from the masters. Such additional copies may be made without employment of a density measuring system.

A method and arrangement of the preceding type are used primarily for so-called party photographs or photographs of a similar nature. The photographer here presents the customer with a set of proofs or trial copies which are used to order additional copies of the same or different size. An advantage is that data on the amounts of copy light which were used for the proofs and yielded results satisfactory to the customer can be stored and used again for the production of additional copies. A high degree of similarity between the proofs and the additional copies is obtained in this manner.

Such a procedure is disclosed, for example, in the German patent 29 33 252 where the exposure corrections employed for the proofs are stored in a program carrier which is then placed in storage together with the roll of film used to make the proofs. The program carrier and the film are removed from storage only when additional copies are to be made.

The masters or originals here remain in the copying establishment so that the photographer is bound to a specific processing laboratory. This is generally unacceptable.

In order to make new copies when the proofs are unsatisfactory, the European patent application 0 177 857 proposes to store the exposure values used for the proofs in a magnetic memory, e.g., a floppy disc. The masters or negatives, which are in the form of a strip, are assigned numbers which correspond to the order of the masters on the strip and the exposure value or values for each master are stored in correlation to the number of the respective master. The number of a master is imprinted on the back of the corresponding proof and serves as an address for retrieval of the exposure value or values from the floppy disc. To find the stored exposure value or values for a particular master, it is thus necessary to have the corresponding proof with the imprinted number of the master. However, while the proof is available when it is unsatisfactory and a new proof must be made, this is not the case where the proof has been left with the customer as assurance that any additional copies ordered will be of a certain quality.

SUMMARY OF THE INVENTION

It is an object of the invention to provide a method for the reproduction of a master which allows stored exposure parameters for the master to be retrieved independently of proofs of the master.

Another object of the invention is to provide a method for the reproduction of the masters in a strip which enables stored exposure parameters for a master to be retrieved even when the master is returned for an order of copies without proofs.

An additional object of the invention is to provide an arrangement for the reproduction of a master which permits stored exposure parameters for the master to be retrieved independently of proofs of the master.

A further object of the invention is to provide an arrangement for the reproduction of the masters in a strip which makes it possible to retrieve stored exposure parameters for a master even though the master is presented without proofs.

The preceding objects, as well as others which will become apparent as the description proceeds, are achieved by the invention.

One aspect of the invention resides in a method of copying one or more masters or originals of a strip of masters or originals, e.g., one or more negatives of an exposed and developed filmstrip. The method comprises the steps of connecting the strip to a band so that the band extends by the masters; providing the band with an identification code for each of the masters, preferably an identification code which is readable by machine, at a location related to the position of the respective master; deriving base data relating to the optimum amount of copy light for each of the masters; and storing the identification code for each of the masters together with the base data for the respective master.

The step of deriving base data relating to the optimum amount of copy light for a master may include measuring a density of the master; calculating an amount of copy light based on the measured density; making a trial copy of the master using the calculated amount of copy light; and evaluating the trial copy. The deriving step for each master may further include making a correction based on evaluation of the corresponding trial copy.

The method of the invention may additionally comprise the steps of reading out the stored base data for at least one selected master using the respective code; and making a second copy of the selected master using the respective base data. The invention makes it possible to produce the second copy without the use of a system for measuring the density of the master.

The method according to the invention may also comprise the steps of ordering at least one copy of a selected master; and reading the code for the selected master from said band. The stored base data is then read out using the respective code and a copy of the selected master is made using the respective base data.

The method of the invention may further comprise the steps of generating first reproducible characteristic values relating to the densities of the masters; subsequently ordering at least one copy of a selected master; repeating the generating step for the selected master following the ordering step to obtain a second characteristic value relating to the density of the selected master; comparing the first characteristic value for the selected master with the second characteristic value; and correcting the stored base data for the selected master when the second characteristic value differs from the first characteristic value.

According to one embodiment of the method, the characteristic value for each master is the density of the master after fogging.

In accordance with another embodiment of the method, a plurality of characteristic values are generated for each master. The characteristic values for each master include the integral densities of at least a predetermined portion of the master in each of the three primary colors red, green and blue. The predetermined portion is selected so that the size thereof is sufficiently large for reproducibility.

The strip with the masters may have an emulsion and the coded band affixed to the strip then has a first side adjacent to the emulsion and a second side which is remote, or faces away, from the emulsion. The identification codes, which may be bar codes, are here preferably provided on the second side of the band. A bar code reader may be used to read the bar codes from the band preparatory to storing the codes and base data.

The base data may comprise density data and such density data may be in the form produced by a video color negative analyzer.

Another aspect of the invention resides in an arrangement for copying one or more masters of a strip of masters. The arrangement comprises means for connecting the strip to a band so that the band extends by the masters; means for providing the band with an identification code, e.g., a bar code, for each of the masters at a location related to the position of the respective master; means for deriving base data relating to the optimum amount of copy light for each of the masters; and means for storing the identification code for each of the masters together with the base data for the respective master.

The means for deriving base data relating to the optimum amount of copy light for each of the masters may include a copier having density measuring means and calculating means for the calculation of amounts of copy light from measured densities.

According to one embodiment of the invention, the deriving means includes a first copier having first means for generating first characteristic values for the masters. The arrangement here further comprises a second copier having second means for generating second characteristic values for the masters; and means for comparing the first and second characteristic values for a master and correcting the corresponding base data when the first and second characteristic values differ.

The first and second generating means may be designed to generate integral densities for a predetermined portion of each master in each of the primary colors red, green and blue. It is preferred for the first and second generating means to have at least approximately the same structure.

In accordance with the invention, an information carrier in the form of a band is secured to the strip of masters and used to establish a permanent association between each master and an address for the same. Only a relatively small amount of space is required for the addresses so that the information carrier can be relatively narrow. The permanent association between a master and its address makes it possible, in turn, to reliably retrieve from a memory stored exposure data relating to the master.

The novel features which are considered as characteristic for the invention are set forth in particular in the appended claims. The improved copying method, as well as the structure and mode of operation of the improved copying arrangement, will, however, be best understood upon perusal of the following detailed description of certain specific embodiments when read in conjunction with the accompanying drawings.

DESCRIPTION OF THE PREFERRED EMBODIMENTS

Figure 1:
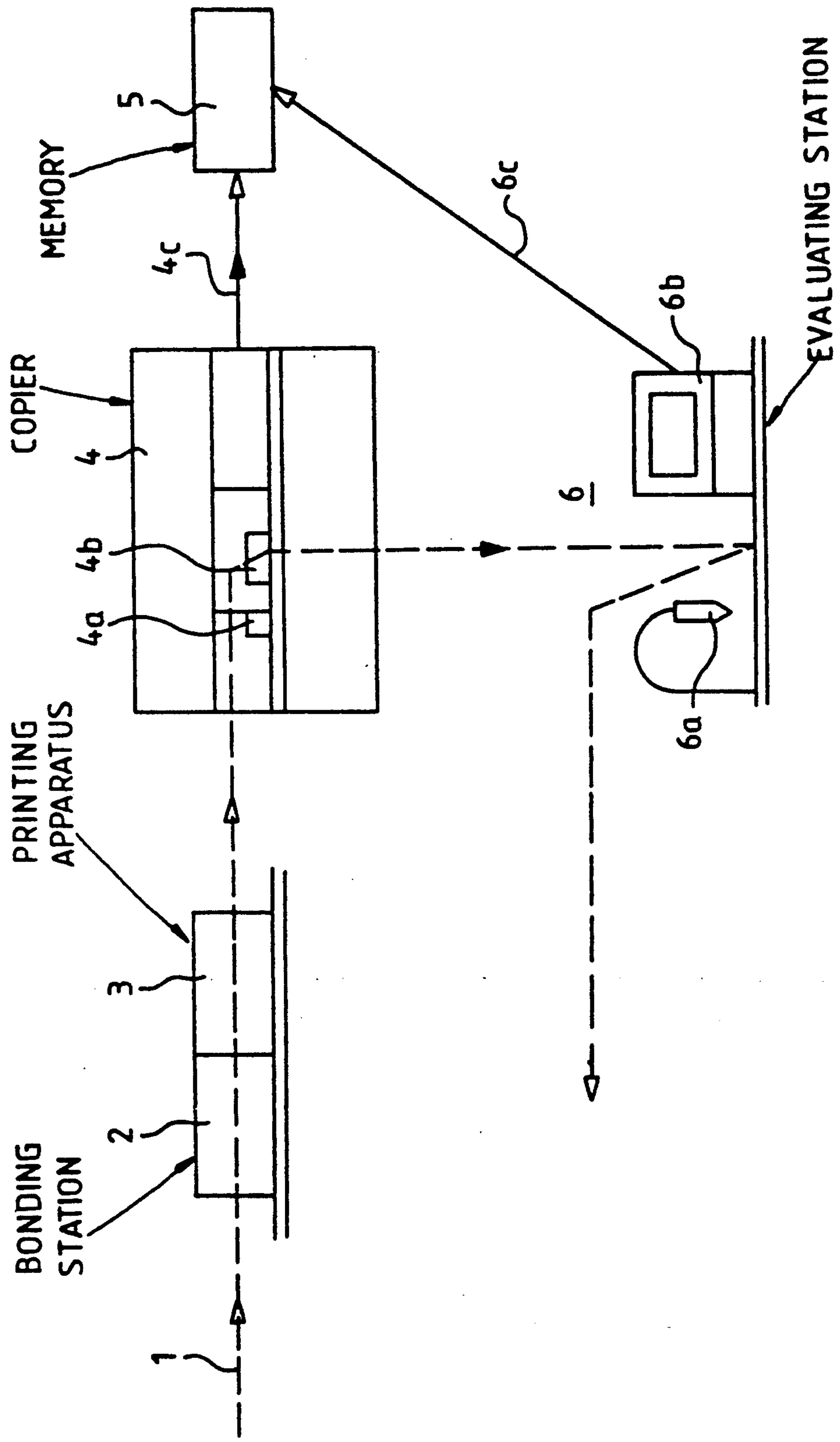
FIG. 1 schematically illustrates certain components of a copying arrangement in accordance with the invention.

Referring to FIG. 1, the reference numeral 1 identifies a strip of masters or originals to be processed. The strip 1 is here assumed to be an exposed and developed filmstrip having negatives which constitute the masters or originals. The filmstrip 1 may be an uncut film of normal length which is exiting an appropriate developing apparatus or may be constituted by a series of similar films which have been joined end-to-end so as to form an extended filmstrip.

The filmstrip 1 is connected to a continuous data carrier in the form of a band or strip at a bonding station 2. The filmstrip 1 and the data carrier are joined to one another edge-to-edge so that the data carrier extends along the filmstrip 1 and by all of the negatives. If the filmstrip 1 has a perforated edge, the data carrier may be connected to the filmstrip 1 at such edge. The filmstrip 1 and the data carrier may be connected to each other by means of an adhesive strip or a thermal sealing emulsion. The data carrier can consist of paper, for example.

A printing apparatus 3 is located adjacent to the bonding station 2. In the printing apparatus 3, an identification number or address in coded form is printed on the data carrier for each negative. The identification code for each negative, which is readable by machine and is preferably in the form of a bar code, is placed on the data carrier in a predetermined positional relationship to the respective negative. The digits used to identify the negatives are selected so as to avoid repetition of any number for at least four weeks and are thus based on the anticipated number of negatives to be processed within such period.

The printing apparatus 3 may be a conventional bar code printer.

If the filmstrip 1 is constituted by film, such as 110 or 126 mm film, having apertures which are disposed in predetermined positional relationships to the negatives, the positional relationships between the identification codes and the respective negatives can be readily established by means of an appropriate sensor. On the other hand, if the filmstrip 1 comprises film of small size or unperforated film having a width of 6 cm, the positional relationships, which are also important for the copying operation, can be established by an operator or by a photoelectric sensing device such as is used for so-called automated notching and senses the unexposed areas between neighboring negatives. In the latter case, it is necessary to take into account that films of the same width may have different lengths. Thus, in addition to the standard 24×36 mm format for film of small size, there are half-size and square formats. Similarly, film having a width of 6 cm is available in 6×9, 6×7, 6×6 and 6×4.5 cm formats.

After leaving the printing apparatus 3, the filmstrip 1, together with the attached information carrier having the addresses of the negatives, travels to a first copier or printer 4. The film platform of the copier 4 is provided with a scanner 4a which scans each negative region-by-region, i.e., at a multiplicity of points. The scanner 4a functions to measure the densities of the respective regions in each of the three primary colors red, green and blue. Before the start of the copying operation for a given film, all or a majority of the negatives of the film can be scanned region-by-region and, in accordance with the teachings of the German patent 28 40 287, the resulting data can be processed to yield so-called density difference curves. In conjunction with the specific density data for a particular negative, these curves make it possible to calculate optimum amounts of copy light for the negative in each of the primary colors red, green and blue. In principle, the calculations can be simplified by using measurements obtained only from the particular negative to be copied. Here, the amounts of copy light are optimized on the basis of integral or region-by-region measurements, possibly with the assistance of an operator, by inputting correction factors.

Aside from optimized amounts of copy light, the specific density data for each negative are also used to calculate characteristic density values for the negative, e.g., the integral density values in the three primary colors.

The importance of the characteristic values will be discussed in greater detail below. For a given negative, the characteristic values can, for instance, be the integral density values in the three primary colors of a predetermined portion of the negative which extends over virtually the entire surface of the negative.

Trial copies of the negatives are now made in the copier 4 using the base exposure data, that is, the +densities or amounts of copy light, obtained as above. The base exposure data, together with the characteristic values, are sent to a memory 5 via a data conductor 4c. The base exposure data for each negative are stored in the memory 5 under the address assigned to the respective negative. A bar code reader 4b in the copier 4 reads the identification codes or addresses of the negatives from the information carrier affixed to the filmstrip 1.

The copies produced using the amounts of copy light calculated in the manner described earlier are forwarded to an evaluating station 6 for evaluation of their quality. If the results of the copying operation are unsatisfactory, correction factors are generated. The correction factors are sent to the memory 5 via a conductor 6c while the negatives are returned to the copier 4 for the production of second trial copies. The correction factors are fed to the memory 5 by an inputting device 6b. The addresses for storage of the correction factors are fed to the memory 5 by a bar code reader 6a via the conductor 6c.

Once optimized trial copies or proofs have been produced, these optimized trial copies are sent to the photographer together with the filmstrip 1 and the attached data carrier. The photographer, in conjunction with his or her customer, for example, prepares an order for additional copies.

The order for additional copies includes information on the number of copies to be made from each negative and the sizes of the copies, and the order is accompanied by the filmstrip 1 and the attached data carrier. The procedure which is followed upon receipt of the order is described with reference to FIG. 2.

It may happen that copies of greatly different size are desired for a particular negative. The order is advantageously sorted into groups according to the required width of the copy paper and the desired surface finish, and the negatives of each group can be reproduced in a copier or printer onto a roll of copy paper. In the event that copies of greatly different size are to be made from a given negative, it may be necessary to pass such negative through the copier more than once.

The order for additional copies is sent to a preparation station 7. The preparation station 7 is provided with a bar code reader 7a which reads the address of the exposure data in the memory 5 for each of the negatives. The preparation station 7 is further provided with an inputting device 7b for entering ordering information for each negative into the memory 5. Such ordering information includes the required number of copies, the sizes of the copies, the surface finishes and the order number. If the order is contained in a bag, the ordering information can appear on the bag in the form of a bar code and can be read from the bag. The ordering information for each negative is stored in the memory 5 under the address assigned to the respective negative.

Figure 2:
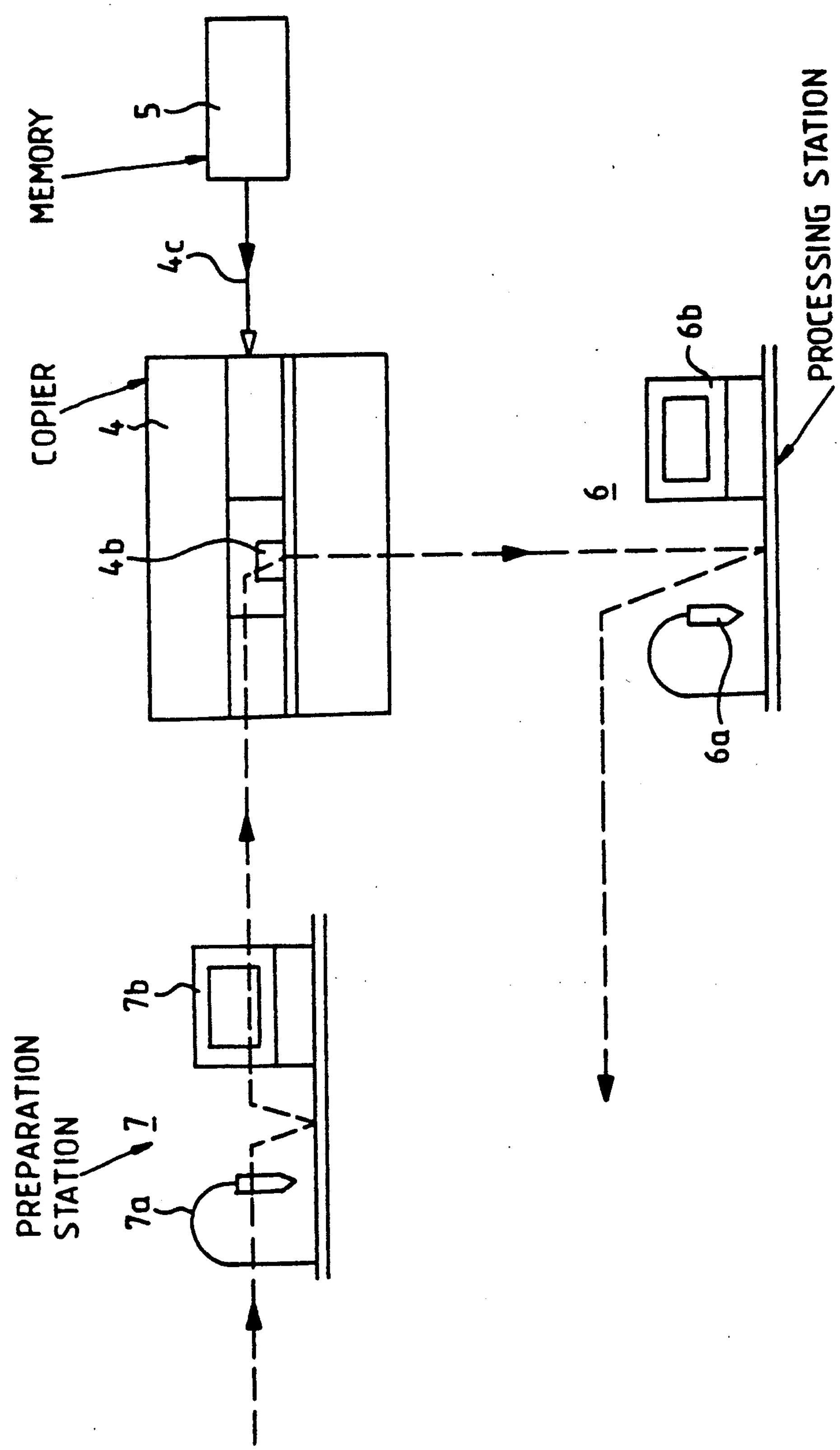
FIG. 2 schematically illustrates additional components of the copying arrangement.

From the preparation station 7, the negatives are sent to a copier or printer which need not be the same one used to make the trial copies. In FIG. 2, the copier or printer is identified by the reference numeral 4' and is assumed to be a different copier than the copier 4 of FIG. 1. The copier 4' for the additional copies has a bar code reader 4b' integrated therein, and the bar code reader 4b ' reads the addresses from the data carrier so that an operator need do nothing more than conduct the negatives into the copier 4'. The desired size of a copy must naturally be compatible with the copy material in the copier 4'. The exposure data and ordering information for a negative are read out of the memory 5 by the copier 4' via a data conductor 4c' when the respective negative travels past the bar code reader 4b'.

A more compact arrangement can be achieved by providing for the ordering information to be inputted to the memory 5 at the copier 4'.

It has been found that the filmstrip 1 can undergo changes of varying magnitude between the production of the trial copies and the additional copies depending upon the type of film, the quality of the developing process for the film, the length of time from the making of the trial copies to the making of the additional copies, and the storage conditions for the filmstrip 1. If the exposure data are transferred unchanged from the memory 5 to the copier 4', there may be greater or lesser deviations, depending upon the relative importance of these effects, between the trial copies and the additional copies. Such deviations are often critically examined by the photographer and are desirably avoided.

To this end, the densities of the negatives are once again measured in the copier 4' with the same scanner as used for the trial copies. The density measurements obtained for a negative in the copier 4' are used to calculate second characteristic density values, e.g., integral densities in the three primary colors red, green and blue, for the respective negative. The second characteristic density values for each negative are then compared with the first characteristic density values for the respective negative, that is, the characteristic density values calculated on the basis of the density measurements made in the first copier 4 of FIG. 1 and stored in the memory 5. Differences between the first and second characteristic density values are used to calculate correction factors for the exposure data read out of the memory 5. The calculations used for the correction factors are known and can be the same as those used in the calibration of printers, for example. Reference may be had, for instance, to the German patent 29 11 566. Relatively simple computing circuits or algorithms exist for these calculations and can perform the same very rapidly. The corrected exposure data or amounts of copy light for each negative are entered in the memory 5 under the address for the respective negative in case a second order is placed.

The exposed and developed additional copies obtained using the exposure data which was stored in the memory 5 and corrected if necessary are sent to a processing station 6'. The design of the processing station 6' may be identical to that of the evaluating station 6 of FIG. 1 and, under appropriate circumstances, it is even possible to dispense with the processing station 6' and use the evaluating station 6. The processing station 6' has a bar code reader 6a' which serves primarily to read the order number. The processing station 6' further has an inputting device 6b' which, based on the price agreed to by the customer, functions to calculate the price for the entire order.

Figure 3:
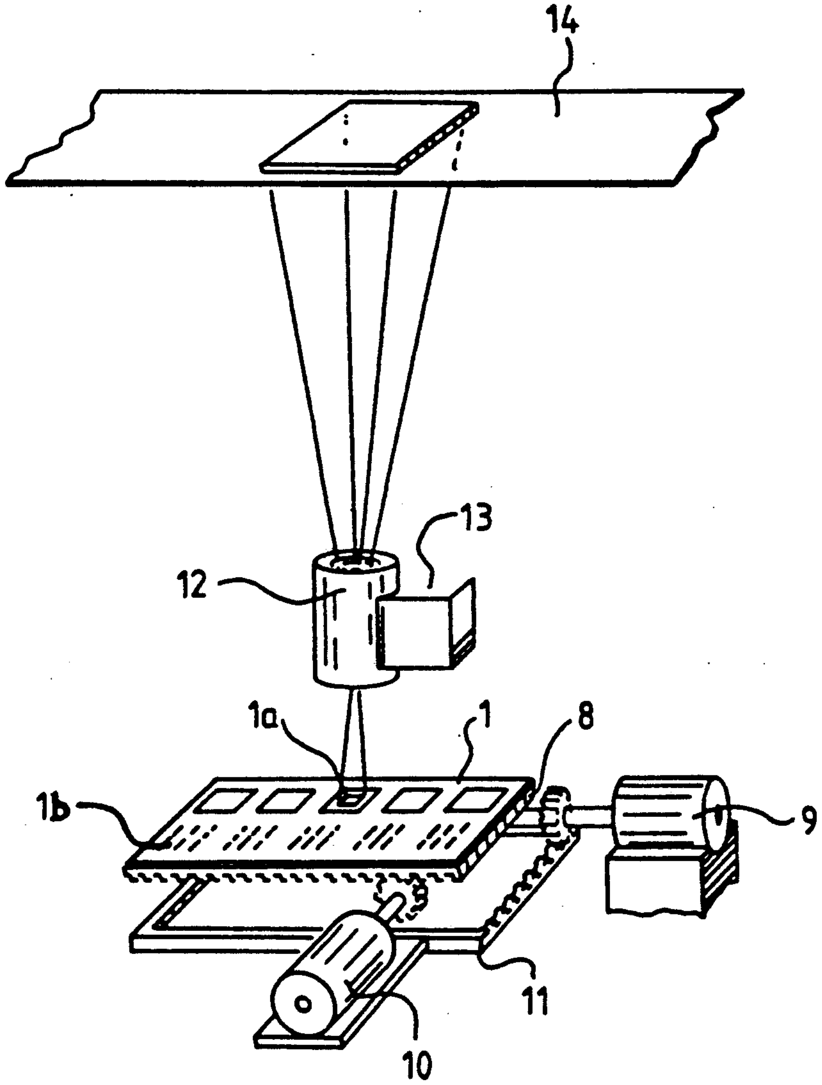
FIG. 3 schematically illustrates the structure of a printer which can be used in the copying arrangement.

The second copier 4' for the additional copies possesses certain characteristics which have not yet been described and distinguish it from the first copier 4 for the trial copies. These features of the second copier 4' are illustrated in FIG. 3.

In this embodiment of the copier 4', it is possible to change the magnification so that the additional copies can have sizes different from those of the trial copies. Furthermore, it is possible to image specific segments, and even off-center segments, on a band of copy paper 14. To these ends, the copier 4' is provided with an objective 12 of variable focal length, i.e., a so called zoom objective, which can be set by an adjusting motor 13 in accordance with the requirements of an order received at the preparation station 7.

Moreover, the platform can be rotated through 90 degrees by a non-illustrated motor to thereby permit an image of a negative 1a to be oriented on the copy paper 14 either longitudinally or transversely so as to conform to the size of the copy paper 14. Two different formats can thus be obtained from the same band of copy paper 14.

By additionally providing movable masking bands in the positive plane and designing the table for the negatives 1a to be shiftable out of the middle transversely by a distance equal to one-half the width of a negative 1a, the images of two negatives 1a can be formed adjacent to one another in the longitudinal direction or, alternatively, the same negative 1a can be imaged on the copy paper 14 twice. FIG. 3 illustrates one possible design for the shiftable table. Here, the reference numeral 8 identifies a film carrier on which the filmstrip 1 with the negatives 1a and the data carrier 1b is placed. The film carrier 8 is shiftable in the x-direction and the y-direction. An adjusting motor 10 is provided to move the film carrier 8 longitudinally while an adjusting motor 9 is provided to move the film carrier 8 transversely. The adjusting motor 9 has a pinion which meshes with complementary teeth 11 on an intermediate plate.

Ordering information can be entered on a data carrier at the preparation station 7. The ordering information can include data on the desired longitudinal and transverse dimensions of the positive which determine the rotational setting; and magnification data which determines adjustment of the objective 12. A particular situation in which adjustment of the objective 12 will be required is that where a segment of a negative 1a is to be magnified to such a degree that the entire image of the negative 1a no longer fits on the copy material 14.

Whenever the size of an additional copy is to be different from the size of the corresponding trial copy, the amounts of copy light used for the trial copy must be corrected by means of so-called geometry factors which account for the relationship between magnification and copy light intensity. Such corrections are readily made based on the respective magnification.

If an off-center segment of a negative 1a is to be enlarged, the position of the segment must be preselected by prescribing the magnitudes of the movements to be effected via the motors 9 and 10 along the respective coordinates.

The use of a data carrier which can be freely programmed with data for each negative 1a makes it possible to sequentially produce copies of different size from a given negative 1a.

The copier for the trial copies and that for the additional copies have significantly different requirements. The former must have a scanner and a computer for calculating exposure values while the latter must have means for varying image size and a device, e.g., a scanner, for determining the characteristic values. An apparatus with all of these elements can be used for both the trial copies and the additional copies.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A method of copying one or more masters of a strip of masters, comprising the steps of connecting said strip to a band so that the band extends by said masters; providing said band with an identification code for each of said masters at a location related to the position of the respective master; deriving base data relating to the optimum amount of copy light for each of said masters; storing the identification code for each of said masters in a memory together with the base data for the respective master; reading out from the memory the stored base data for at least one selected master using the respective code on the band and the corresponding code in the memory; and making a copy of the selected master using the respective base data.

2. The method of claim 1, wherein said codes are readable by machine.

3. The method of claim 1, wherein the deriving step for each master comprises measuring a density of the master, calculating an amount of copy light based on the measured density, making a trial copy of the master using the calculated amount of copy light and evaluating the trial copy.

4. The method of claim 3, wherein the deriving step for each master further comprises making a correction based on evaluation of the respective trial copy.

5. The method of claim 1, wherein said base data comprises density data.

6. The method of claim 5, wherein the density data is in the form produced by a video color negative analyzer.

7. The method of claim 1, wherein said strip has an emulsion and said band has a first side adjacent to said emulsion and a second side remote from said emulsion, said codes being provided on said second side.

8. The method of claim 7, wherein said codes are bar codes.

9. The method of claim 8, further comprising the step of reading said bar codes from said band preparatory to the storing step.

10. The method of claim 1, further comprising the steps of generating first reproducible characteristic values relating to the densities of said masters, subsequently ordering at least one copy of a selected master, repeating the generating step for the selected master following the ordering step to obtain a second characteristic value relating to the density of the selected master, comparing the first characteristic value for the selected master with the second characteristic value, and correcting the stored base data for the selected master when the second characteristic value differs from the first characteristic value.

11. The method of claim 10, wherein a plurality of characteristic values are generated for each master, the characteristic values for each master including the integral densities of at least a predetermined portion of the master in each of the three primary colors red, green and blue, and the predetermined portion being of a size sufficiently large for reproducilibity.

12. The method of claim 10, wherein the characteristic value for each master is the density of the master after fogging.

13. An arrangement for copying one or more masters of a strip of masters, comprising means for connecting the strip to a band so that the band extends by the masters; means for providing the band with an identification code for each of the masters at a location related tot he position of the respective master; means for deriving base data relating to the optimum amount of copy light for each of the masters; and a memory separate from the band and having means for storing the identification code for each of the masters together with the base data for the respective master.

14. The arrangement of claim 13, wherein said providing means comprises means for forming a bar code on the band.

15. The arrangement of claim 13, wherein said deriving means comprises a copier having density measuring means and calculating means for the calculation of amounts of copy light from measured densities.

16. The arrangement of claim 13, wherein said deriving means comprises a first copier having first means for generating first characteristic values for the masters; and further comprising a second copier having second means for generating second characteristic values for the masters, and means for comparing the first and second characteristic values for a master and correcting the corresponding base data when the first and second characteristic values differ.

17. The arrangement of claim 16, wherein said first and second generating means are at least approximately the same.

18. The arrangement of claim 16, wherein each of said first and second generating means comprises means for generating integral densities for a predetermined portion of each master in each of the primary colors red, green and blue.

* * * * *